United States Patent
Bendel et al.

(10) Patent No.: US 11,409,727 B2
(45) Date of Patent: Aug. 9, 2022

(54) CONCURRENT EXECUTION OF DATABASE OPERATIONS

(71) Applicant: International Business Machines Corporation, Armonk, NY (US)

(72) Inventors: Peter Bendel, Holzgerlingen (DE); Oliver Harm, Stuttgart (DE); Knut Stolze, Hummelshain (DE); Björn Broll, Waldenbuch (DE)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 16/940,292

(22) Filed: Jul. 27, 2020

(65) Prior Publication Data
US 2021/0081394 A1 Mar. 18, 2021

(30) Foreign Application Priority Data
Sep. 18, 2019 (EP) .................................... 19197996

(51) Int. Cl.
*G06F 16/00* (2019.01)
*G06F 16/23* (2019.01)

(52) U.S. Cl.
CPC ...... *G06F 16/2336* (2019.01); *G06F 16/2379* (2019.01)

(58) Field of Classification Search
CPC .................. G06F 16/2336; G06F 16/2379
USPC ......................................................... 707/703
See application file for complete search history.

(56) References Cited

U.S. PATENT DOCUMENTS

| | | | |
|---|---|---|---|
| 6,055,547 A | 4/2000 | Cooper | |
| 8,775,749 B2 | 7/2014 | Accapadi | |
| 9,811,261 B1 * | 11/2017 | Ramani | ................ G06F 3/0673 |
| 2007/0016548 A1 * | 1/2007 | Iyer | ..................... G11B 27/329 |
| 2010/0299490 A1 | 11/2010 | Attarde | |
| 2012/0124270 A1 | 5/2012 | Weissman | |

(Continued)

FOREIGN PATENT DOCUMENTS

CN 102542041 A 7/2012

OTHER PUBLICATIONS

"Reclaiming unused space within an extent", IBM® Informix® 12.10, last printed May 19, 2020, 1 page, <https://www.ibm.com/support/knowledgecenter/en/SSGU8G_12.1.0/com.IBM.perf.doc/ids_prf_322.htm>.

(Continued)

*Primary Examiner* — Vincent F Boccio
(74) *Attorney, Agent, or Firm* — Michael A. Petrocelli

(57) ABSTRACT

The present disclosure relates to executing concurrent database operations in a database system during a time window. The database operations are configured to use storage units of a storage space of the database system. A first usage speed of free storage units is determined to be used by at least one first database operation and a second usage speed of free storage units to be used by a second database operation. The first and second usage speeds may be used for determining a maximum number of free storage units to be used by the second database operation during the time window. The second database operation may be executed during the time window in accordance with the maximum number. The first database operation may be executed, wherein the execution of the first database operation during the time window being limited to the storage units of the storage space.

19 Claims, 4 Drawing Sheets

(56) References Cited

U.S. PATENT DOCUMENTS

| | | | |
|---|---|---|---|
| 2012/0124305 A1 | 5/2012 | Weissman | |
| 2013/0318126 A1* | 11/2013 | Graefe | ................ G06F 16/2246 |
| | | | 707/797 |
| 2014/0324917 A1 | 10/2014 | Haas | |
| 2015/0199147 A1 | 7/2015 | Goldberg | |
| 2017/0083556 A1 | 3/2017 | Bonner | |
| 2018/0101413 A1* | 4/2018 | Watanabe | ................ G06F 9/505 |
| 2019/0220418 A1 | 7/2019 | Chen | |
| 2020/0311035 A1* | 10/2020 | Chung | .................. G06F 16/148 |
| 2021/0216517 A1* | 7/2021 | Graefe | ................ G06F 16/2246 |

OTHER PUBLICATIONS

International Search Report and Written Opinion, International Application No. PCT/IB2020/057855, International Filing Date Aug. 21, 2020.

\* cited by examiner

CONCURRENT EXECUTION OF DATABASE OPERATIONS

BACKGROUND

The present invention relates to the field of digital computer systems, and more specifically, to executing concurrent database operations in a database system.

A tenant may allocate a space in a file system that is shared with other tenants. This allocation may have an impact on tenants who cannot use that space even if it is not used by the first tenant anymore. A process releasing free space may thus need to be executed. For example, if the tenant drops tables in a database of the space, the allocated space has to be released back to the file system. Systems may not release that allocated space automatically and require the execution of some commands/statements to trigger it. However, the execution of the releasing process may induce conflicts with other concurrent running workloads using the space. This becomes even more critical with mass operations like bulk loads that need many new pages in a very short time window.

SUMMARY

Various embodiments provide a method for executing concurrent database operations in a database system, computer system, and computer program product as described by the subject matter of the independent claims. Advantageous embodiments are described in the dependent claims. Embodiments of the present invention can be freely combined with each other if they are not mutually exclusive.

In one aspect according to the present invention, a method executes concurrent database operations in a database system during a time window, and the database operations are configured to use storage units of a storage space of the database system. The method includes determining a first usage speed of free storage units for use by at least one first database operation, and a second usage speed of free storage units for use by a second database operation. The method further includes using the first and second usage speeds for determining a maximum number of free storage units for use by the second database operation during a time window. The method includes executing during the time window the second database operation in accordance with the maximum number; and executing the first database operation, the execution of the first database operation during the time window being limited to the storage units of the storage space.

In another aspect according to the present invention, a computer program product executes concurrent database operations in a database system during a time window. The database operations are configured to use storage units of a storage space of the database system. The computer program product comprises a computer readable storage medium having program instructions embodied therewith, and the program instructions are executable by a computer to cause the computer to perform functions, by the computer, comprising the functions to: determine a first usage speed of free storage units for use by at least one first database operation, and a second usage speed of free storage units for use by a second database operation; use the first and second usage speeds to determine a maximum number of free storage units for use by the second database operation during a time window; execute during the time window the second database operation in accordance with the maximum number; and execute the first database operation, the execution of the first database operation during the time window being limited to the storage units of the storage space.

In another aspect according to the present invention, a computer system for executes concurrent database operations in a database system during a time window, and the database operations are configured to use storage units of a storage space of the database system. A computer system comprising; a computer processor, a computer-readable storage medium, and program instructions stored on the computer-readable storage medium being executable by the processor, to cause the computer system to perform the following functions to; determine a first usage speed of free storage units for use by at least one first database operation, and a second usage speed of free storage units for use by a second database operation; use the first and second usage speeds to determine a maximum number of free storage units for use by the second database operation during a time window; execute during the time window the second database operation in accordance with the maximum number; and execute the first database operation, the execution of the first database operation during the time window being limited to the storage units of the storage space.

In other aspects according to the present invention, in one aspect, the invention relates to a method for executing concurrent database operations in a database system during a time window, the database operations being configured to use storage units of a storage space of the database system. The method comprises determining a first usage speed of free storage units to be used by at least one first database operation and a second usage speed of free storage units to be used by a second database operation, using the first and second usage speeds for determining a maximum number of free storage units to be used by the second database operation during the time window, executing during the time window the second database operation in accordance with the maximum number, executing the first database operation, the execution of the first database operation during the time window being limited to the storage units of the storage space.

In another aspect, the invention relates to a computer system for executing concurrent database operations in a database system during a time window, the database operations being configured to use storage units of a storage space of the database system. The computer system is configured for determining a first usage speed of free storage units to be used by at least one first database operation and a second usage speed of free storage units to be used by a second database operation, using the first and second usage speeds for determining a maximum number of free storage units to be used by the second database operation during the time window, executing during the time window the second database operation in accordance with the maximum number, executing the first database operation, the execution of the first database operation during the time window being limited to the storage units of the storage space.

In another aspect, the invention relates to a computer program product comprising a computer-readable storage medium having computer-readable program code embodied therewith, the computer-readable program code configured to implement the operations of the method according to preceding embodiments.

BRIEF DESCRIPTION OF THE SEVERAL VIEWS OF THE DRAWINGS

In the following embodiments of the invention are explained in greater detail, by way of example only, making reference to the drawings in which the following figures are included.

DETAILED DESCRIPTION

Figure 1:
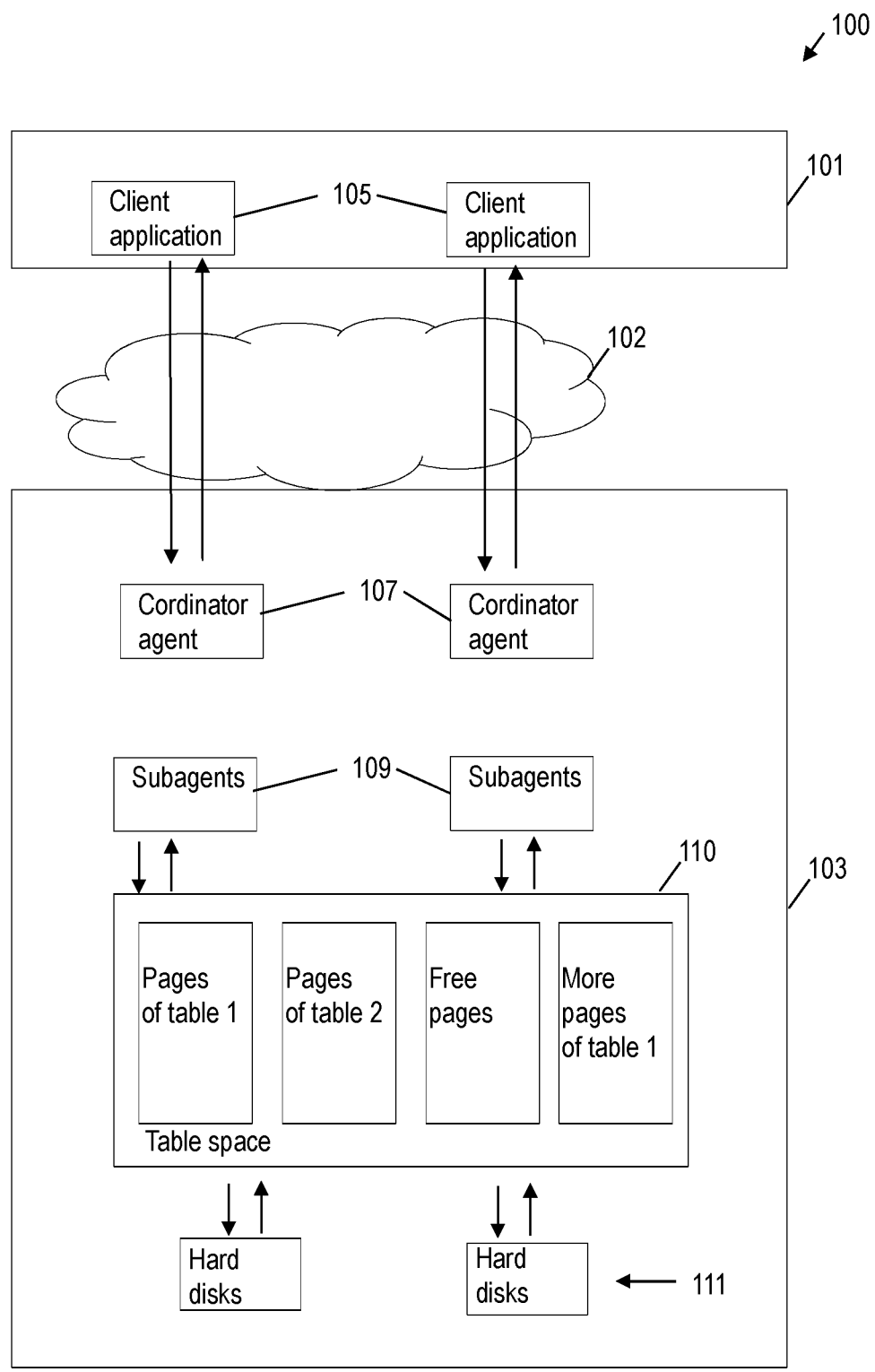
FIG. 1 depicts a diagram of a data processing system.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The database system may comprise one or more databases. A database of the databases comprises storage spaces. That is, those storage spaces are allocated for the database. A storage space may be a storage location where actual data underlying database objects of the database can be kept. The storage space serves to allocate storage for data to be stored in the database. The storage space may, for example, be a collection of pages such as a file. The storage space may be a table space, an index space, or a virtual memory. The storage unit may, for example, be a page. A database operation may, for example, enable access to the database. A storage unit may be associated with a status value indicating a status of the storage unit. A storage unit may be configured to comprise data. A status of a storage unit indicates if the storage unit is a free storage unit. A free storage unit is a storage unit that is not used by a database operation. The free storage unit may either be an empty storage unit (e.g. it has never been used) or contain data written by a database operation in the past but the data is not used anymore e.g. the data has not been used for a time period longer than a predefined maximum allowed period. For example, a storage unit may be configured to comprise records. Each of the records may be mapped to respective disk blocks of the database system. A data record or record is a collection of related data items such as a name, date of birth and class of a particular user. A data record represents an entity, wherein an entity refers to a user, object, or concept about which information is stored in the data record.

A database operation may for example be initiated by a user's application or may be a database system-initiated database operation. The term "user" may refer to an entity e.g., an individual, a computer, or an application executing on a computer that initiates database operations e.g. for requesting to insert data items. The first database operation may for example be initiated by a user application. The second database operation may be initiated by the database system. A database operation may, for example, use at least one page of the storage space. Using a page may, for example, comprise modifying the page. Modifying a page comprises inserting one or more records in the page and/or deleting one or more records from the page and/or changing one or more records in the page and/or changing a status of the page. The database system may comprise multiple storage spaces, wherein each storage space of the multiple storage spaces is allocated or assigned to a respective one or more database operations. A database operation can use storage units of a storage space assigned to it and if there are no storage units in that storage space to be used by the database operation, the database operation may request an allocation of extra storage units. However, the request of such extra storage units may take a long time and may thus slow down the execution of the database operations.

The terms "first" and "second" as used herein refer to labels for nouns that they precede, and do not imply any type of ordering (e.g., spatial, temporal, logical) unless explicitly defined as such. According to one embodiment, the first database operation may start before the second database operation starts. This may be advantageous in case of database systems that regularly run maintenance database operations. For example, the second database operation may be a maintenance database operation that is regularly performed on the database system e.g. the second database operation may be used to reclaim free pages. Since it is regularly performed, the execution of the second database operation may coincide with the execution of other database operations during the maintenance period. Since the maintenance operation is executed more frequently than other database operations, such as the first database operation, it can be limited in a given time window as it will run again later. Thus, limiting a regularly executed maintenance operation may be advantageous compared to limiting the other database operation which may occur only once.

According to one embodiment, the second database operation may start at the same time or before the first database operation starts. By starting earlier, the second database operation has the benefit of first using the resources of the database system. Thus, by limiting the second database operation to a maximum number of free storage units during the time window, an optimal sharing of resources between the database operations may be enabled. Since the second database operation used some resources before the first database operation starts, it can be limited during the time window so that the first database operation can have enough resources.

In one example, the method may automatically be performed in response to determining that the first and second database operations are or will be concurrently running during the time window. This may enable an autonomous functioning database system. This may particularly be advantageous as a space reclamation for table spaces may run for a longer time (several minutes), and it is unknown when a new bulk load will occur. By automatically performing the present method, whenever the bulk load is occurred, it may be taken into account.

According to one embodiment, each storage unit of the storage units is associated with a status value indicating whether the storage unit is allocated to the first and second database operations. The storage space comprises storage units that are allocated for the first and second database operations, wherein using a storage unit by the second database operation comprises changing the status value of the storage unit to indicate that the storage unit is not allocated to the first database operation. Once a database operation accessing a given database is finished or completed, the allocated storage units of the database operation may not be allocated to the database operation anymore and can be allocated (e.g. if they become free) for another database operation accessing the given database.

This embodiment may advantageously and seamlessly be integrated in existing systems for the following example reasons. In existing systems, database administrators execute a maintenance command in regular intervals e.g. the time window is an interval of the intervals. The second database operation may be triggered by the maintenance command. This maintenance command may for example automatically be executed. This may result in the maintenance command being concurrently running with other one or more active workloads of the first database operation. For example, bulk loads may insert lots of data into the table space while the size of that table space shall be reduced by the maintenance command Conflicts between the space reclamation and the bulk loads may be avoided by this embodiment. For example, this may prevent that a just released space to be re-allocated for the table space, or may prevent failures of the bulk operations.

This embodiment may improve the use of a free space. For example, if 10 tables with 1 terabyte (TB) of data each were added by the first database operation to the storage space, and 9 out of those 10 tables are dropped, 9 TB of free space exists in the storage space and may not be used by the first database operation. The present subject matter may enable other files in a file system to access this free space by making it available using the second database operation.

According to one embodiment, the determining of the maximum number is performed so that the first database operation is performed on storage units without requesting allocation of the storage units used by the second database operation. For example, the second database operation can reallocate necessary pages so that the first database operation can run on pages of the storage space without having to request for a reallocation of pages.

According to one embodiment, the method further comprises providing a fixed number of free storage units of the storage space that can be used by the first database operation during the time window in accordance with the first usage speed, computing a first number as the difference between the fixed number and the total number of free storage units of the storage space that can be used by the second database operation, computing a second number of free storage units that can be used by the second database operation during the time window in accordance with the second usage speed, wherein the determined number is the smallest number of the first and second numbers.

The fixed number of free pages may be an estimate of free pages that can be used during the time window by the first database operation. Those free pages may be referred to as intermediate free pages as they need to be used during the time window by the first database operation. Thus, the second database operation can only reallocate permanent free pages. The first number may be an estimate of the number of permanent free pages during the time window.

This embodiment may be advantageous as it may enable an accurate and reliable method for concurrently running multiple database operations without conflict. Before the first database operation starts, a number of storage units is assigned to it. The first database operation may for example comprise multiple load requests and delete requests. During execution of the first database operation, intermediate free pages may be created (e.g. by delete requests) but the first database operation needs those intermediate free pages during the time window. The fixed number of pages may include an estimate of those created intermediate free pages, so that the second database operation can only use permanent free pages. For example, a typical workload during a day may involve 5000 load operations where each load operation is compensated by an associated delete operation and overall the space required stays relatively constant. In this case, a reclaiming operation may only become active once more delete requests than insert requests (and some pages would be freed permanently) are present.

According to one embodiment, the method further comprises providing a buffer that comprises the fixed number of free storage units, wherein the buffer is configured to comprise different numbers of storage units. In one example, the buffer may be reserved logically. The second database operation may be configured to use the buffer, e.g. before starting the second database operation, to determine how many free pages it can use by subtracting the number of free pages of the buffer from the total number of free pages of the storage space. By provisioning a buffer of pages not to be freed and that is big enough to cover usual fluctuations of inserts and deletes (involved in the first database operation) during the time window, a zig-zag line behavior of storage size may be avoided. For example, the content of the buffer may change for another iteration of the present method e.g. the buffer size may change when repeating the method for another pair of first and second database operations concurrently running in another time window. This may enable a systematic execution of the present method.

According to one embodiment, the method further comprises: determining a sum speed as the sum of the first and second usage speeds; determining a fraction of the second usage speed present in the sum speed; multiplying the number of storage units in the storage space by the fraction, wherein the determined maximum number is the result of the multiplication. This embodiment may enable an accurate and reliable method for concurrently running multiple database operations without conflict.

According to one embodiment, determining the maximum number of free storage units is performed before the first database operation starts. This may enable an optimal execution of concurrent database operations. For example, this embodiment may speed up the execution of the first database operation compared to the case where the determination is performed during the time window because the second database operation may exceed that maximum while being determined. In addition, if an already free page is available in the storage space, using that page is faster than allocating a new page on the file system level.

According to one embodiment, determining the maximum number of free storage units is performed during execution of the first database operation. This may save processing resources that would otherwise be required for performing the determination although the first database operation did not start or failed.

According to one embodiment, the determining of the first usage speed and second usage speed are performed using monitoring data indicative of a processing history of database operations in the database system. Using data from the same database system in which the method is executed may enable an accurate and reliable estimation of the speeds.

According to one embodiment, the first usage speed is a maximum speed of determined usage speeds from the monitoring data and the second usage speed is a minimum speed of determined usage speeds from the monitoring data.

The first database operation may comprise multiple insert and/or delete and/or update requests or tasks. The first usage speed may for example indicate how many new data pages can be written in a given time window. The first usage speed may for example be the maximum speed for all bulk load operations involved in the first database operation. Information used for determining the first and second usage speeds may be available either from dedicated performance measurements, or by constantly monitoring the database system, gathering the throughput, and calculating the maximum or minimum value.

The second usage speed may be a minimum speed for reclaiming free pages, e.g. how many pages are reclaimed at least in a given time window. The second usage speed may be computed by determining how many pages are free pages in the storage space and can be reclaimed. The method enables to limit the number of pages to be reclaimed such that there remain at least as many free pages available that a bulk load can fill during the time needed for the space reclamation.

According to one embodiment, the storage space is allocated for the first and second database operations. The first database operation is a database operation of storing data in the storage space, and the second database operation is a database operation of reallocating storage units of the storage space. This may enable to keep free pages as resources available for a concurrent workload and only reclaim a portion that will not be used by that concurrent workload in a certain time frame.

According to one embodiment, the storage space is a table space and the storage units being pages, wherein the first database operation is a bulk load insert operation and the second database operation is a page reclamation operation.

According to one embodiment, the database, DB, system is a DB2™ for Linux™, UNIX™ and Windows™, DB2™ LUW.

These embodiments may enable a seamless integration of the present subject matter in existing DB2™ LUW systems. DB2™ LUW uses table spaces as containers for the physical storage of tables. A table space is structured into pages. The pages are used for different tables, and some of the pages may have been used in the past but the data on them was deleted (either individual rows or whole tables were dropped), and those pages become free pages. In order to remedy such situations, DB2™ LUW offers the maintenance command for reclaiming free pages. The command may be defined as follows: ALTER TABLESPACE<table_space_name>REDUCE<n>. The command specifies a page number for freeing space. In this case, the command indicates by how many pages the table space shall be reduced.

FIG. 1 depicts a diagram of a data processing system 100. The data processing system 100 comprises a client system 101 and a database system 103. The client system 101 is connected to the database system 103 via a network 102. The network 102 may for example be implemented in a wireline or wireless fashion, e.g., using wireless protocols and technologies, such as WiFi, WiMax, etc.

The client system 101 may comprise one or more client applications 105. Each of the client applications 105 may be configured to access data in the database system 103. For that, the client applications 105 may for example be linked with the DB2™ universal database client library that enables communication with a database system that supports DB2™ systems. The DB2™ universal database client library may provide the functionality required for the client applications 105 to access the database system 103.

An application of the applications 105 may be configured to initiate a database action or operation. For that, a TCP/IP communication may for example be established between the application 105 and an agent of the agents 107 of the database system 103. The agents 107 of the database system 103 may be configured to control activities in the database system 103. In particular, the agents 107 enable to perform most of data processing on behalf of the applications 105. Multiple subagents 109 can be assigned if the database system 103 has multiple processors or is part of a partitioned database. The agents 107 distribute database requests to the subagents 109. The subagents 109 perform the requests for the applications 105.

The database system 103 may comprise one or more storage spaces 110 of one or more databases of the database system 103. The storage space 110 may be allocated or assigned a disk space of hard disks 111 as indicated in FIG. 1. Each disc space may comprise pages that can be used to store table data.

Figure 2:
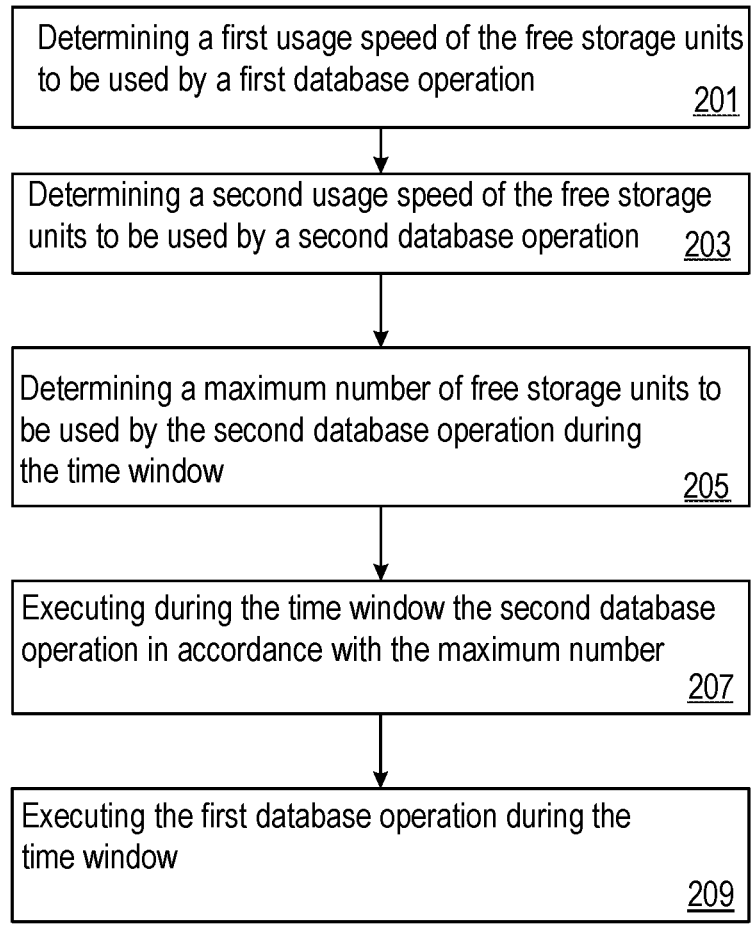
FIG. 2 is a flowchart of a method for executing concurrent database operations in a database system in accordance with an example of the present disclosure.

FIG. 2 is a flowchart of a method for executing concurrent database operations in a database system during a time window. The database operations may use storage units of a storage space. Using storage units may comprise using at least free storage units of the storage space e.g. the first database operation may continue using a storage unit that started using it in a time window preceding the present time window. The storage space may for example be a table space of a database. The storage space is allocated or associated to at least one database operation of the database operations. For example, the storage space may be assigned to a first database operation of the database operations.

Each database operation of the database operations may be configured to use a certain number of free storage units per time unit. That is, each database operation may have a usage speed of free storage units. Using a free storage unit may for example comprise writing data into the free storage unit or reclaiming the free storage unit. Reclaiming the free storage unit may comprise reassigning the free storage unit so that it belongs to another storage space e.g. that is assigned to another database operation.

The first database operation may for example comprise one or more load requests or tasks e.g. the first database operations may comprise N load requests e.g. N=5000. The load requests may insert data into a free storage unit or overwrite data of a storage unit. The second database operation may be a reclaiming database operation. The reclaiming database operation may be configured to reallocate or reassign free storage units.

The second database operation may for example be periodically performed in the database system. For example, the second database operation may be configured to be executed in predefined time intervals, e.g. every Monday of a week, or from LOAM to 11 AM every day. The present method may be executed during at least part of the time intervals. The time window may be a time interval of the time intervals.

A first usage speed of free storage units to be used by the first database operation may be determined in step 201. The first usage speed is the number of free storage units that the first database operation uses during a given time unit. The first usage speed may be estimated in step 201 using history data comprising, for example, log records of database operations similar to the first database operation. Database operations may be similar if they comprise the same type of requests (e.g. insert requests) and/or initiated by a same application and/or executed at a same time period. In another example, the first usage speed may be user defined e.g. the determining of the first usage speed may comprise receiving a user input indicative of the first usage speed.

The first database operation may comprise multiple bulk load requests that need to run concurrently. Since the speed of the sum of all concurrent bulk loads is bounded by the maximum input/output operations per second (IOPS) enabled by the hardware of the database system, all loads together can only process a max number of storage units per time interval. The first usage speed may be defined as that max number of pages per time interval. That is, if multiple bulk loads run concurrently, they will compete for resources and the load speed will go down for both. If multiple loads achieve a higher combined load speed, that combined value may be the first usage speed.

A second usage speed of free storage units to be used by a second database operation may be determined in step 203. The second usage speed indicates how many storage units are reclaimed at least in the time window.

Figure 3:
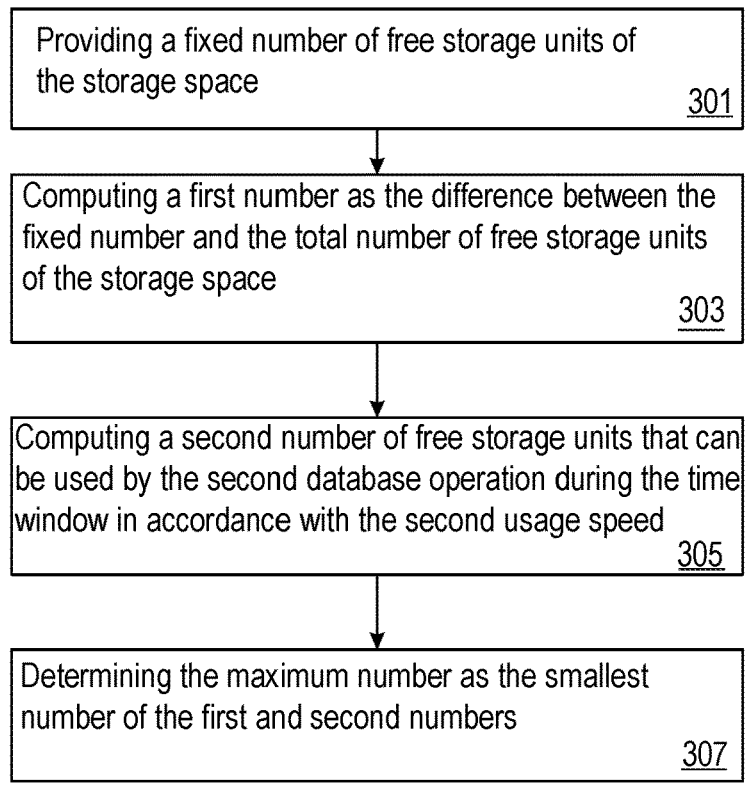
FIG. 3 is a flowchart of a method for determining a maximum number of free storage units that can be used by a database operation that is concurrently running with another database operation.
Figure 4:
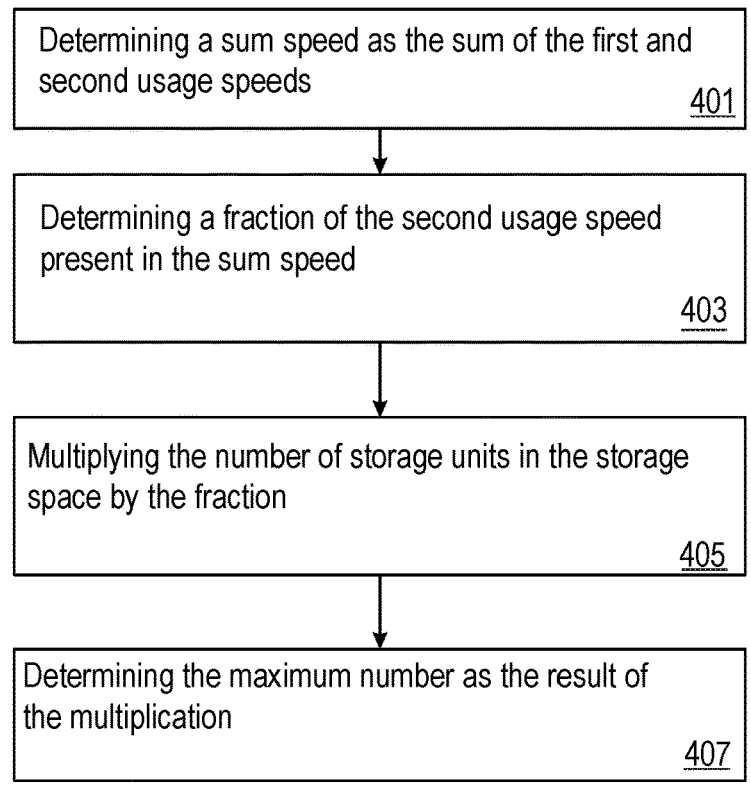
FIG. 4 is a flowchart of a method for determining a maximum number of free storage units that can be used by a database operation that is concurrently running with another database operation.

The first and second usage speeds may be used for determining in step 205 a maximum number of free storage units to be used by the second database operation during the time window. FIGS. 3 and 4 provide example methods for determining the maximum number of free storage units to be used by the second database operation.

In step 207, the second database operation may be executed during the time window in accordance with the determined maximum number. That is, the second database operation may not use more than the determined maximum number of free storage units during the time window.

In step 209, the first database operation may be executed during the time window, wherein the execution of first database operation is limited to the storage units of the storage space. Since the determined maximum number limits the second database operation to a predefined number of storage units, this leaves enough storage units to be used by the first database operation during the time window without having to request extra storage units. That is, the execution of the first database operation is limited to the storage units of the storage space. This may prevent any potential intrusion on pages that could be used by concurrent operations (like bulk loads).

The first database operation may start before the time window. That is, during the time window, the first database operation continues its execution. In another example, the first database operation may start execution at the start of the time window.

FIG. 3 is a flowchart of a method for determining a maximum number of free storage units that can be used by a database operation that is concurrently running with another database operation.

In step 301, a fixed number of free storage units of the storage space may be determined. The storage space may, for example, be a table space and the storage unit may be a page. The fixed number of free storage units of the storage space may be a number of storage units that can be used by the first database operation during the time window using the first usage speed. For that, a buffer may be used. The buffer may be reserved (e.g. logically) for the first database operation. Within the same time window needed by bulk loads (of the first database operation) to fill this buffer, the space reclamation by the second database operation can release excess free storage units back to the file system. This guarantees that space reclamation will not run longer than the bulk load will need and assumes the worst-case of space reclamation being slow and bulk load being as fast as possible. Accordingly, the first usage speed is determined as a maximum speed and the second usage speed is determined as a minimum speed as described with reference to FIG. 2.

A first number may be computed in step 303 as the difference between the fixed number and the total number of free storage units of the storage space. The first number is the number of storage units that are available for reclamation. The first number may be defined as follows: total_num_reclaimable_pages=num_free_pages−num_pages_in_buffer, where num_pages_in_buffer is the fixed number of pages and num_free_pages is the total number of free storage units of the storage space.

A second number of free storage units that can be used by the second database operation during the time window in accordance with the second usage speed may be determined in step 305. The second number may be defined as follows: num_reclaimable_pages=load_time*reclaim_speed (in pages/s), where the load_time is the time that the bulk load will need (at least) to fill the buffer and may be defined as follows: load_time=num_pages_in_buffer/load_speed. The load_speed is the first usage speed. The load_time may be used as an upper boundary to calculate how many pages (the second number) can be reclaimed (at most) in that time window.

In step 307, the maximum number of free pages that can be used (e.g. reclaimed) by the second database operation may be determined as the smallest number of the first and second numbers. This may limit the number of reclaimable pages. The maximum number may be defined as follows: num_reclaimable_pages=min(num_reclaimable_pages, total_num_reclaimable_pages), where min( ) refers to a function that computes the minimum of two numbers.

FIG. 4 is a flowchart of a method for determining a maximum number of free storage units that can be used by a database operation that is concurrently running with another database operation.

The method of FIG. 4 does not use a buffer. The method of FIG. 4 may be used as a safety measure. The method of FIG. 4 may be based on splitting the number of free pages between space reclamation and a (potential) bulk load.

In step 401, a sum speed may be determined as the sum of the first and second usage speeds. The sum speed may be defined as follows summed_speed=reclaim_speed+load_speed. The reclaim speed is the second usage speed and the load speed is the first usage speed. By means of an example, assuming that the minimum reclaim speed is 250 pages/s and the maximum load speed is 1250 pages/s. In this case the total number of pages modified by either the bulk load or the reclaim is 1500 pages/s.

In step 403, a fraction of the second usage speed present in the sum speed may be determined. In step 405, the total number of free storage units in the storage space may be multiplied by the fraction. This would result in a number of pages that the reclaim can use and can be defined as follows: num_reclaimable_pages=num_free_pages*reclaim_speed/summed_speed. The fraction is defined as the ratio of the reclaim speed and the sum speed: reclaim_speed/summed_speed.

In step 407, the maximum number of free pages that can be used by the second database operation may (or the determined maximum number) may be provided as the result of the multiplication of step 405, num_reclaimable_pages.

Figure 5:
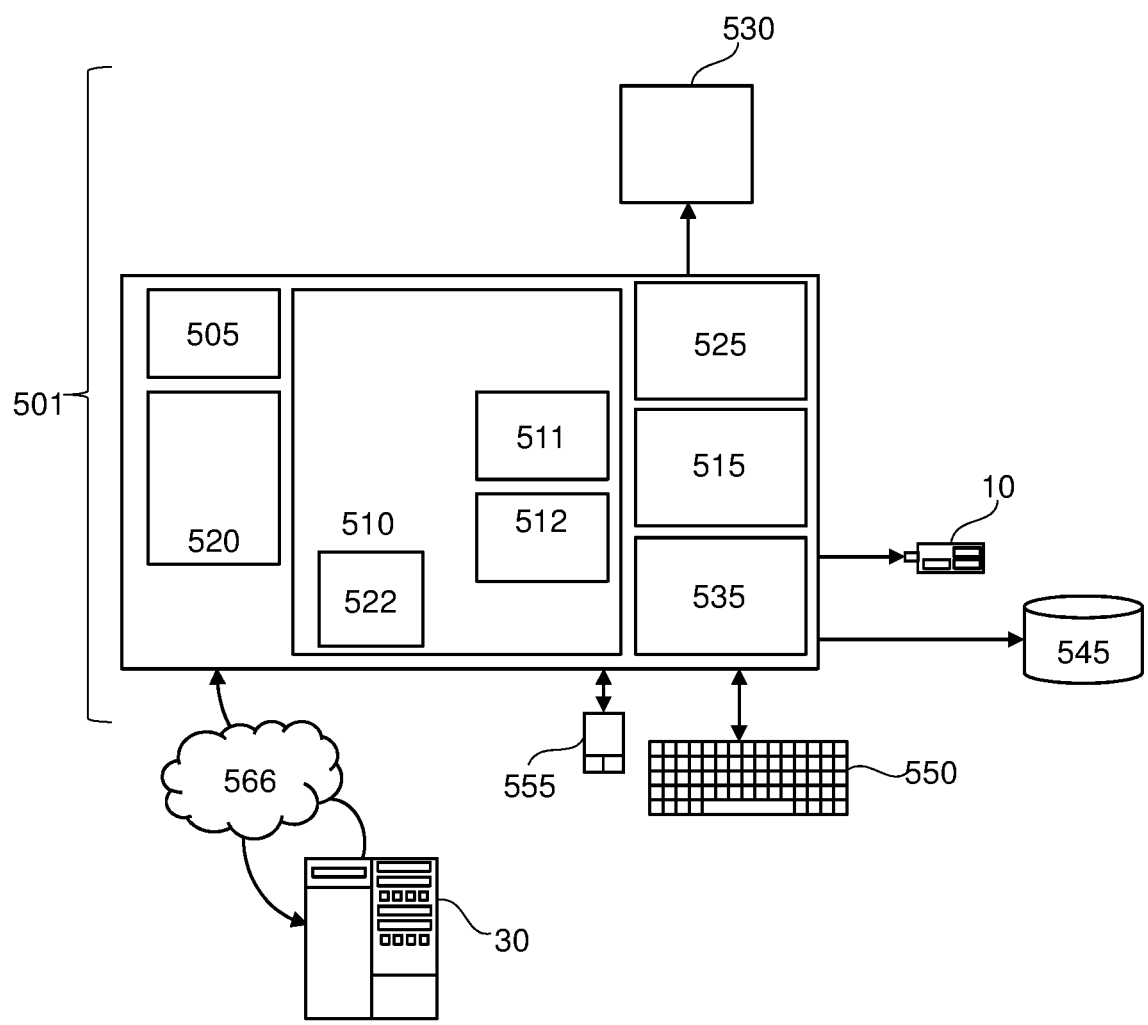
FIG. 5 represents a computerized system, suited for implementing one or more method steps as involved in the present disclosure.

FIG. 5 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 522 (including firmware 522), hardware (processor) 505, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 501.

In exemplary embodiments, in terms of hardware architecture, as shown in FIG. 5, the computer 401 includes a processor 505, memory (main memory)510 coupled to a memory controller 515, and one or more input and/or output (I/O) devices (or peripherals) 10, 545 that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 545 may generally include any generalized cryptographic card or smart card known in the art.

The processor 505 is a hardware device for executing software, particularly that stored in memory 510. The processor 505 can be any custom made or commercially available processor, a central processing unit (CPU), an auxiliary processor among several processors associated with the computer 501, a semiconductor-based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 510 can have a distributed architecture, where various components are situated remote from one another, but can be accessed by the processor 505.

The software in memory 510 may include one or more separate programs, each of which comprises an ordered listing of executable instructions for implementing logical functions, notably functions involved in embodiments of this invention.

The software in memory 510 shall also typically include a suitable operating system (OS) 511. The OS 511 essentially controls the execution of other computer programs.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 510, so as to operate properly in connection with the OS 511. Furthermore, the methods can be written as an object oriented programming language, which has classes of data and methods, or a procedure programming language, which has routines, subroutines, and/or functions.

In exemplary embodiments, a conventional keyboard 550 and mouse 555 can be coupled to the input/output controller 535. Other output devices such as the I/O devices 545 may include input devices, for example but not limited to a printer, a scanner, microphone, and the like. Finally, the I/O devices 10, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 545 can be any generalized cryptographic card or smart card known in the art. The system 101 can further include a display controller 525 coupled to a display 530. In exemplary embodiments, the system 101 can further include a network interface for coupling to a network 566. The network 566 can be an IP-based network for communication between the computer 501 and any external server, client and the like via a broadband connection. The network 566 transmits and receives data between the computer 501 and external systems 30, which can be involved to perform part or all of the steps of the methods discussed herein. In exemplary embodiments, network 566 can be a managed IP network administered by a service provider. The network 566 may be implemented in a wireless fashion, e.g., using wireless protocols and technologies, such as WiFi, WiMax, etc. The network 566 can also be a packet-switched network such as a local area network, wide area network, metropolitan area network, Internet network, or other similar type of network environment. The network 566 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the software in the memory 510 may further include a basic input output system (BIOS) 522. The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software stored within the memory 510, to communicate data to and from the memory 510, and to generally control operations of the computer 501 pursuant to the software. The methods described herein and the OS 511, in whole or in part, but typically the latter, are read by the processor 505, possibly buffered within the processor 505, and then executed.

When the systems and methods described herein are implemented in software, as is shown in FIG. 5, the methods can be stored on any computer readable medium, such as storage 520, for use by or in connection with any computer related system or method. The storage 520 may comprise a disk storage such as HDD storage.

In further examples and embodiment according to the present disclosure, the concurrent database operations may be configured to use respective number of free storage units of the storage space. For example, the first database operation may be configured to use N1 free storage units during the time window and the second database operation may be configured to use N2 free storage units during the time window. At least part of the N1 free storage units may be free pages that are created during the time window. Those created free pages may be referred to as intermediate free pages that can be used during the time window by the first database operation. The first database operation may involve delete operations that create intermediate free storage units in order to be used by other requests of the first database operation. If during the time window, the storage space comprises less than N2+N1 free storage units, the first database operation may only be able to use less than the required N1 free storage units. The present subject matter may prevent this by setting a maximum number of free storage units that can be used by the second database operation. The present subject matter may, thus, enable an efficient use of available storage among different tenants of the database system. The present subject matter may optimize execution of database operations that share storage resources.

Depending on the type of database operations in the storage space, a heavy fragmentation may be prevented by the present subject matter. For example, the first database operation may comprise bulk loads inserting data into the storage space while the size of that storage space may be reduced by the second database operation. With the present subject matter, conflicts between the space reclamation and the bulk loads may be avoided. This may prevent a performance degradation (e.g. it may prevent that a just released space has to be re-allocated for the storage space), and may prevent failures of the bulk loads.

Various embodiments according to the present disclosure are specified in the following paragraphs. The present disclosure includes a method for executing concurrent database operations in a database system during a time window, and the database operations are configured to use storage units of a storage space of the database system. The method includes determining a first usage speed of free storage units to be used by at least one first database operation and a second usage speed of free storage units to be used by a second database operation. The method includes using the first and second usage speeds for determining a maximum number of free storage units to be used by the second database operation during the time window, and executing during the time window the second database operation in accordance with the maximum number. The method includes executing the first database operation, where the execution of the first database operation during the time window is limited to the storage units of the storage space.

In one embodiment, each storage unit of the storage units is associated with a status value indicating whether the storage unit is allocated to the first and second database operations. The storage space comprises storage units that are allocated for the first and second database operations, and using a storage unit by the second database operation comprises changing the status value to indicate that the storage unit is not allocated.

In another embodiment the determining is performed so that the first database operation is performed on storage units without requesting allocation of the storage units used by the second database operation.

In another embodiment, the method of the present disclosure can include: providing a fixed number of free storage units of the storage space that can be used by the first database operation during the time window in accordance with the first usage speed. And further includes computing a first number as the difference between the fixed number and the total number of free storage units of the storage space. And further includes computing a second number of free storage units that can be used by the second database operation during the time window in accordance with the second usage speed, where the determined maximum number is the smallest number of the first and second numbers.

The method can include providing a buffer that is configured to comprise the fixed number of free storage units, wherein the buffer is configured to comprise different numbers of storage units.

The method can further include determining a sum speed as the sum of the first and second usage speeds; determining a fraction of the second usage speed present in the sum speed; and multiplying the total number of free storage units in the storage space by the fraction, where the determined maximum number is the result of the multiplication.

The method can include execution of the first database operation started before starting the second database operation.

The method can include execution of the first database operation started at the same time or starting the second database operation.

The method can include determining the maximum number of free storage units is performed before the first database operation starts.

The method can include determining the maximum number of free storage units is performed during execution of the first database operation.

The method can include the determining of the first usage speed and second usage speed being performed using monitoring data indicative of a processing history of database operations in the database system.

The method can include the first usage speed is a maximum speed of determined usage speeds from the monitoring data and the second usage speed is a minimum speed of determined usage speeds from the monitoring data.

The method can include the storage space being allocated for the first and second database operations, the first database operation being a database operation of storing data in the storage space, and the second database operation being a database operation of reallocating storage units of the storage space.

The method can include the storage space being a table space and the storage units being pages, wherein the first database operation is a bulk load insert operation and the second database operation is a page reclamation operation.

The method can include the database, DB, system being a DB2™ for Linux™ UNIX™ and Windows™, DB2™ LUW.

The method can include method operations being automatically performed in response to determining that the first and second database operations are concurrent database operations during the time window.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for executing concurrent database operations in a database system during a time window, the database operations being configured to use storage units of a storage space of the database system, the method comprising:
    determining a first usage speed of free storage units for use by at least one first database operation, and a second usage speed of free storage units for use by a second database operation;
    using the first and second usage speeds for determining a maximum number of free storage units for use by the second database operation during a time window;
    executing during the time window the second database operation in accordance with the maximum number; and
    executing the first database operation, the execution of the first database operation during the time window being limited to the storage units of the storage space.

2. The method of claim 1, wherein each storage unit of the storage units is associated with a status value indicating whether the storage unit is allocated to the first and second database operations, the storage space comprising storage units that are allocated for the first and second database operations, wherein using a storage unit by the second database operation comprises changing the status value to indicate that the storage unit is not allocated.

3. The method of claim 2, wherein the determining is performed so that the first database operation is performed on storage units without requesting allocation of the storage units used by the second database operation.

4. The method of claim 1, further comprising:
providing a fixed number of free storage units of the storage space for use by the first database operation during the time window in accordance with the first usage speed;
computing a first number as the difference between the fixed number and the total number of free storage units of the storage space; and
computing a second number of free storage units that can be used by the second database operation during the time window in accordance with the second usage speed, wherein the determined maximum number is the smallest number of the first and second numbers.

5. The method of claim 4, further comprising:
providing a buffer that is configured to comprise the fixed number of free storage units, wherein the buffer is configured to comprise different numbers of storage units.

6. The method of claim 1, further comprising:
determining a sum speed as the sum of the first and second usage speeds;
determining a fraction of the second usage speed present in the sum speed;
multiplying the total number of free storage units in the storage space by the fraction, wherein the determined maximum number is the result of the multiplication.

7. The method of claim 1, wherein execution of the first database operation started before starting the second database operation.

8. The method of claim 1, wherein execution of the first database operation started at the same time or after starting the second database operation.

9. The method of claim 1, wherein determining the maximum number of free storage units is performed before the first database operation starts.

10. The method of claim 1, wherein determining the maximum number of free storage units is performed during execution of the first database operation.

11. The method of claim 1, the determining of the first usage speed and second usage speed being performed using monitoring data indicative of a processing history of database operations in the database system.

12. The method of claim 11, wherein the first usage speed is a maximum speed of determined usage speeds from the monitoring data and the second usage speed is a minimum speed of determined usage speeds from the monitoring data.

13. The method of claim 1, wherein the storage space is allocated for the first and second database operations, the first database operation being a database operation of storing data in the storage space, and the second database operation being a database operation of reallocating storage units of the storage space.

14. The method of claim 1, wherein the storage space being a table space and the storage units being pages, wherein the first database operation is a bulk load insert operation and the second database operation is a page reclamation operation.

15. The method of claim 14, wherein the database, DB, system is a DB2 for Linux™, UNIX™ and Windows™, DB2™ LUW.

16. The method of claim 1, wherein the determining, the using of the first and second usage speeds, the executing during the time window, and the executing of the first database operation are automatically performed in response to determining that the first and second database operations are concurrent database operations during the time window.

17. A computer program product for executing concurrent database operations in a database system during a time window, the database operations being configured to use storage units of a storage space of the database system, the computer program product comprising a computer readable storage medium having program instructions embodied therewith, the program instructions executable by a computer to cause the computer to perform functions, by the computer, comprising the functions to:
determine a first usage speed of free storage units for use by at least one first database operation, and a second usage speed of free storage units for use by a second database operation;
use the first and second usage speeds to determine a maximum number of free storage units for use by the second database operation during a time window;
execute during the time window the second database operation in accordance with the maximum number; and
execute the first database operation, the execution of the first database operation during the time window being limited to the storage units of the storage space.

18. A computer system for executing concurrent database operations in a database system during a time window, the database operations being configured to use storage units of a storage space of the database system, which comprises:
a computer system comprising; a computer processor, a computer-readable storage medium, and program instructions stored on the computer-readable storage medium being executable by the processor, to cause the computer system to perform the following functions to;
determine a first usage speed of free storage units for use by at least one first database operation, and a second usage speed of free storage units for use by a second database operation;
use the first and second usage speeds to determine a maximum number of free storage units for use by the second database operation during a time window;
execute during the time window the second database operation in accordance with the maximum number; and
execute the first database operation, the execution of the first database operation during the time window being limited to the storage units of the storage space.

19. The computer system of claim 18, being remotely connected to the database system or comprised in the database system.

* * * * *